INVENTOR.
Charles S. Hazard

Patented Feb. 6, 1951

2,540,618

UNITED STATES PATENT OFFICE 2,540,618

AUTOMATICALLY CONTROLLED LIQUID METERING AND REGISTERING SYSTEM

Charles S. Hazard, New York, N. Y., assignor to Neptune Meter Company, a corporation of New Jersey Application December 20, 1945, Serial No. 636,242

31 Claims. (Cl. 222—26)

This invention relates to dispensing apparatus and more especially to apparatus for measuring and registering and recording measurement of material dispensed.

The invention particularly relates to apparatus for these purposes in which a presettable register is connected to means located at a loading or dispensing station for controlling delivery of the material dispensed, this material being delivered through a measuring device or meter for measuring the amount of the material dispensed. The presettable register is effective upon completion of the registration to operate the delivery control means to stop delivery of the material being dispensed. An operative connection also is provided between the measuring device or meter and the registers, including the presettable register, to drive these registers in integrating and registering operation concomitantly with the measuring operation of the measuring device.

A system and apparatus for such purposes, which is particularly adapted for selective operation of any of a plurality of billing machines comprising the registers with any of a plurality of loading stations comprising the meters and the delivery control devices associated therewith, is disclosed in the applications of Hazard and Shipman Serial No. 448,644, filed June 26, 1942, and Serial No. 583,916, filed March 21, 1945, now Patent 2,538,243, Jan. 16, 1951, the latter application being a division of the former. The present invention constitutes an improvement in certain aspects of the system and apparatus of said applications. This system and apparatus as disclosed in said applications is particularly adapted for dispensing of fluids in which operation of valves controlling flow of the fluid through the meter is controlled by a presettable auto-stop register. The auto-stop register, as well as a resettable integrating register having associated therewith a printing device, is driven from the meter located at the loading station through an operative connection which effects step by step movement of the registers concomitantly with the completion of each unit of measurement by the meter of the fluid delivered therethrough.

In the particular embodiment disclosed in said applications the auto-stop register is arranged to actuate contacts in electric circuits which include electrically energizable means, such as solenoids, for effecting opening movement of the valves controlling the flow of the fluid through the meter, these valves being biased to closed position. In these circuits also are connected contacts which are actuated when an element or button located in the billing machine and corresponding to the meter is actuated, these element actuated contacts conditioning the circuits to make effective the operation of the valves under control of the auto-stop. In the system as disclosed each of the billing machines which include the registers has an element or button for each of the plurality of loading stations for selectively connecting any of the meters and valves of the respective loading stations to any of the billing machines by actuation of the proper element or button.

The operative connection from the meter which effects driving operation of the registers comprises means intermittently actuated by the meter at the completion of each unit of measurement and a step by step clutch device for connecting a motor to the registers, the clutch being brought into driving engagement at each actuation of said means intermittently actuated by the meter. Actuation of the selected element or button also is effective to actuate contacts which condition a circuit for connecting said means intermittently actuated by the meter to said register driving means.

Another contact is actuated by the meter intermittently at the completion of each full unit of measurement of the fluid delivered through the meter. This contact takes over control of the solenoid-operated valves and stops flow upon completion of the last full unit of measurement of the fluid delivered. Thus dispensing of the fluid only in full units is insured.

Upon setting of the auto-stop register of a selected billing machine to an amount to be dispensed and actuation of an element or button located in that machine and associated with a given loading station, that is with a given meter and its control valves, the circuits are conditioned for operation as above described so that the auto-stop will maintain the valve or valves open to effect delivery of the material through the meter while the auto-stop is returning to its initial or zero position. When the auto-stop register reaches zero position the contacts operated thereby are opened and the solenoids of the fluid control valves would be de-energized to effect closure of the valves under their bias, except that the contact which is intermittently actuated by the meter and which takes over control of the valves from the auto-stop register continues delivery until the completion of the last full unit of measurement as above stated.

The present invention utilizes the members and elements of the system above briefly described. Actuation of any of the elements or buttons of any selected billing machine which are associated respectively with different meters, however, is effective in the apparatus if the applications Serial Nos. 448,644 and 583,916 to operate means for preventing change of the setting of the auto-stop of the billing machine on which the selected element or button is located. It is necessary, therefore, in operating the apparatus of these applications first to set the auto-stop and then to actuate the button corresponding to the meter and loading station through which the material is to be dispensed. Because of the construction of the auto-stop it may be driven in registering operation so as to return to its zero position but its setting may not be changed after the element or button has been actuated. Actuation of the element or button in the apparatus of the applications also is effective to reset the integrating register and the register utilized for making the printed record, means being provided for automatically effecting holding of the actuating element in its actuated position upon completion of the resetting operation to maintain the element actuated contacts which effect conditioning of the circuits in actuated position. In the apparatus of said applications, however, the element or button must be held by hand until the resetting operation is completed.

It is an object of the invention to provide in a system and apparatus for registering and recording the amount of material dispensed as measured by a meter and under control of a presettable register means for preventing change in the setting of the presettable register which permits setting of the presettable register at any time up to the initiation of delivery of material to be dispensed.

A more specific object of the invention is to provide in a system and apparatus operating generally in the manner of that disclosed in said applications Serial Nos. 448,644 and 583,916 means for preventing change in the setting of the auto-stop register, after it has been set to a setting corresponding to the amount of material to be dispensed, which means becomes effective when the valves controlling the flow of fluid are operated to start delivery of the fluid.

A further object of the invention is to condition the operation of the means for preventing change in the setting of the auto-stop register upon the completion of the resetting operation so that it will be effective after the register has been prepared for the integrating registering operation in accordance with the delivery of the material through the meter.

An important object of the invention is to make possible the setting of the auto-stop register at any time before or after the actuation of a selected element or button up to the moment when the delivery of the fluid is started by the loading station operator or by the driver receiving the delivery.

Another object of the invention is to provide means for preventing setting of the auto-stop register when the paper on which the printed record is made, as for issuing a ticket showing the amount dispensed, breaks or runs out at the printing device.

A still further object of the invention is to provide means auxiliary to the systems above generally described for preventing improper operation thereof due to "coasting" of the meter, particularly a fluid meter through which fluid carrying entrained air or other gases is passed, such "coasting" occurring after the control valves are shut to stop the flow and being caused by compression of entrained air or gas.

In that aspect of the invention which concerns the prevention of change of the setting of the auto-stop register it is a feature thereof that means are provided which are actuated concomitantly with the operation of the valves under the control of the auto-stop register and which are effective for preventing change in the setting by preventing operation of the parts which are operable by hand or otherwise to effect such setting, such prevention becoming effective after all of the requisite parts of the system have functioned to start delivery of the fluid. This preventing means is maintained in operation, however, after the auto-stop has released its control of said valves and of said means and until the system is fully conditioned for stopping delivery. Provision may be made for discontinuing the action of this preventing means upon operation of the device to print the record of the registered amount. Preferably this discontinuance of the preventing means becomes effective only after the auto-stop has released its control of the valves, that is upon return of the auto-stop to zero position, and after operation of the means above referred to for completing the delivery in full units of measurement.

Upon actuation of an element or button on the machine with which the auto-stop is associated, resetting operation of the integrating register, particularly of the register associated with the printing device, is effected. Means are thereby actuated which make the preventing means effective to prevent change in the setting of the auto-stop register only when, as above described, the auto-stop register is set to a setting corresponding to the amount to be delivered and thereafter the valves are opened by the means under control of the loading station operator or of the driver to effect delivery of the fluid. When the auto-stop register returns to zero and the control which is effected by the meter to insure delivery only in full units has released the valves for final closing, the preventing means then may be released concomitantly with operation of means for printing the record. Thereafter, either before or after resetting operation of the register but before delivery is started, the auto-stop again may be set to position corresponding to a new amount of material to be dispensed and the metering and registering and recording operations repeated.

Thus, the preventing means does not interfere with the setting of the auto-stop register at any time up to the moment when the valves are opened. The auto-stop register may be set at any time prior to the actuation of an element or a button for connecting a given loading station to a selected machine or it may be set after the actuation of such element or button but prior to opening of the valves. Since upon actuation the element or button resetting operation of the integrating and printing registers is effected and since delivery of the fluid cannot occur until the auto-stop register is set, the invention provides flexibility in the order of operation of the devices for conditioning the system for delivery of the fluid while insuring that all of the devices necessary to be operated to obtain delivery are operated so as to secure controlled delivery and registration of the delivered amount regardless of the order of their operation prior to opening of the valves. The apparatus and system of the invention, therefore, are not dependent upon the machine attendant to carry out, in a predetermined order of operations, conditioning of the machine for effecting delivery at a given loading station and registration and recording on a selected machine.

In that aspect of the invention which concerns the breaking or running out of the paper on which the record is printed, the invention provides means cooperating with the paper and connected to the means for preventing change in the setting of the auto-stop register which is effective to bring said means for preventing change in the setting of the auto-stop into operation when the paper fails. The paper when feeding in the normal manner supports and prevents actuation of a member which upon failure of the paper is allowed to fall and to make an operative connection to said preventing means. The auto-stop register, therefore, is prevented from being set until the paper is renewed for feeding in the normal manner through the printing register.

The "coasting" operation of the meter above referred to may occur immediately after the valve controlling the delivery is shut, the fluid under pressure compressing the entrained air or gas and causing the fluid to continue to flow through the meter until the entrained air or gas is compressed to the static pressure of the fluid in the pipe leading to the meter. In order to overcome the effect of such "coasting" operation means are provided which cooperate with the means which is actuated by the meter intermittently at intervals corresponding to the completion of each full unit of measurement of the fluid flowing through the meter so as to be effective, as above mentioned, to complete the delivery of the fluid in full units of measurement. The means for overcoming the effect of "coasting" operation acts upon the means controlling the valve so as to stop flow of the fluid and to prevent re-opening of the valve even though "coasting" movement of the meter should bring about actuation of said intermittently actuated means which otherwise would re-establish or might re-establish operative connection to the valve for effecting opening movement thereof. In the particular embodiment of the invention in a system similar to that disclosd in said applications Serial Nos. 448,644 and 583,916, the means for overcoming the effect of "coasting" comprises an auxiliary relay for actuating a contact in the circuit leading to the solenoid for operating the valve which is controlled by said means intermittently actuated by the meter.

Other objects and features of the invention will be understood from the description of the drawings to follow, in which.

Figure 1:
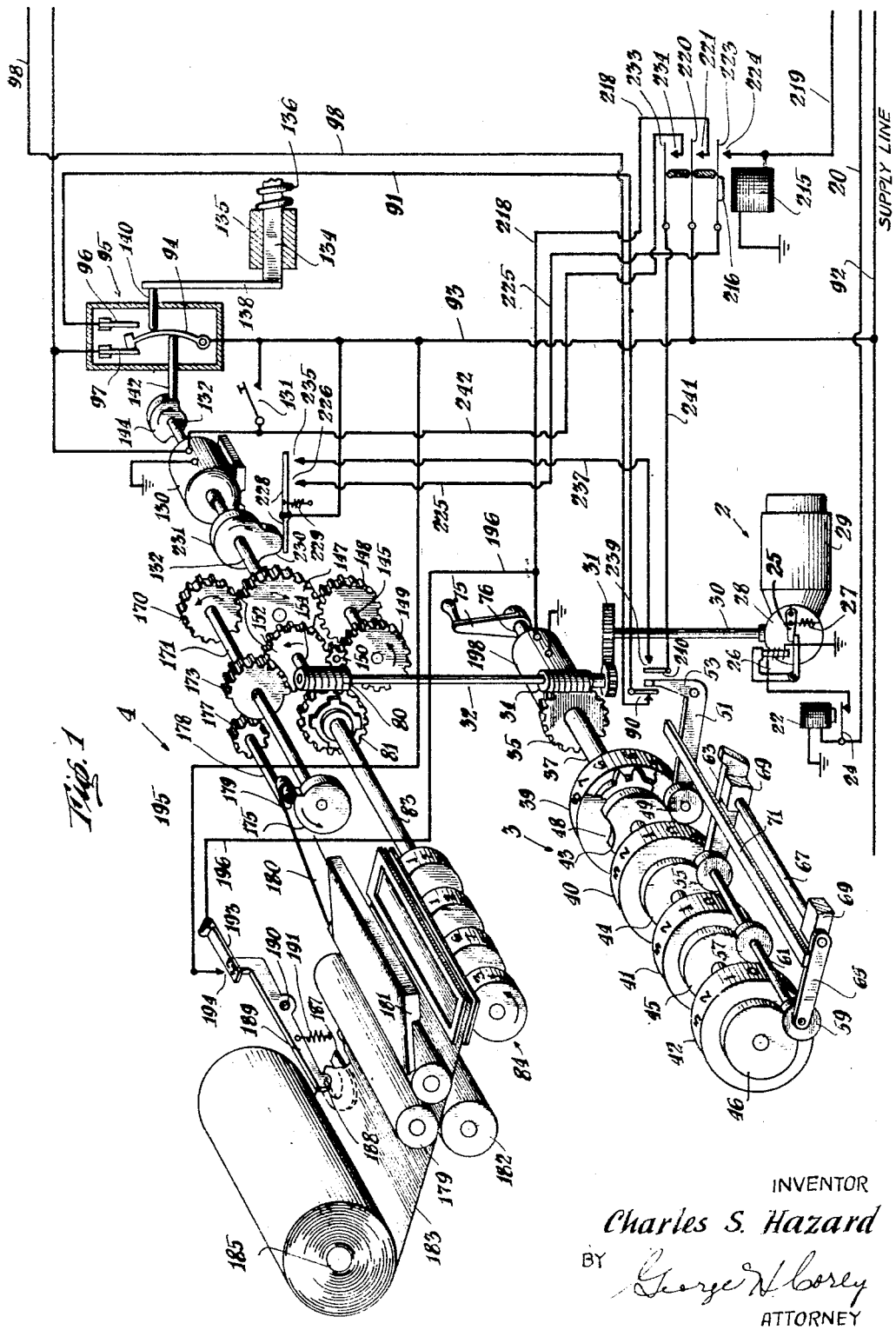
Fig. 1 shows schematically a part of a billing machine and particularly the registers thereof.
Figure 2:
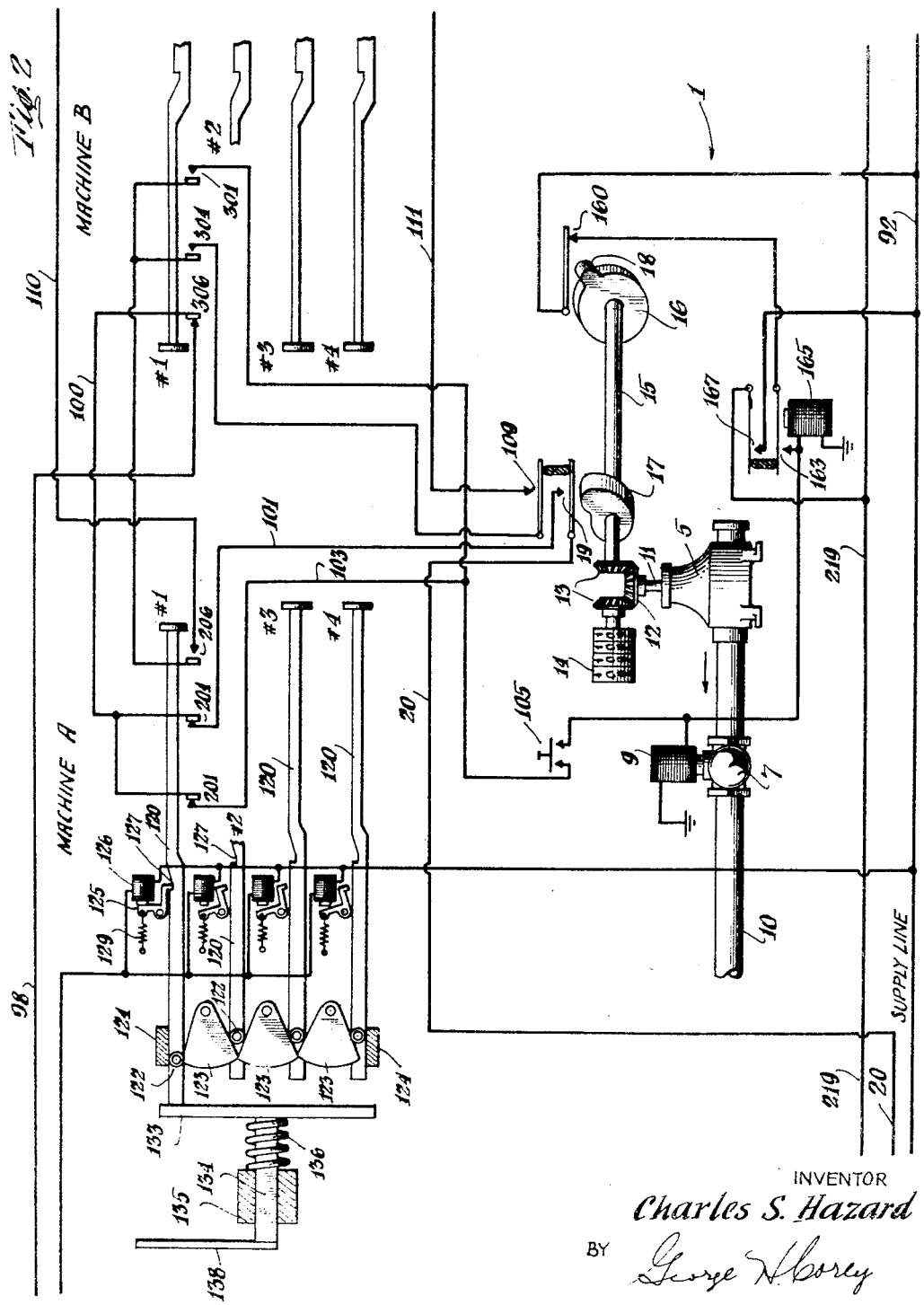
Fig. 2 shows schematically in the upper portion thereof the elements or buttons and associated parts which are actuatable to connect the loading stations to two different billing machines, the lower portion of this figure showing the apparatus located at a loading station.

In the lower portion of Fig. 2 the loading station is identified generally by the numeral 1. In Fig. 1 the drive operated under the control of the meter as hereinafter described is shown generally by the numeral 2. This drive 2 is effective to drive the auto-stop register 3 as well as the integrating and printing register and the auxiliary parts identified generally by the numeral 4.

The loading station as shown in Fig. 2 comprises a meter 5 connected in the delivery pipe 10 for fluid to be dispensed and controlled by a valve 7 which may be of the type which is biased to closed position, the valve being operated to open position by energizing the solenoid 9 operatively connected thereto. The meter shaft 11 carries a bevel gear 12 driving bevel gears 13, one of which operates a visual register 14 and the other carried by shaft 15 rotates said shaft and cam 17 mounted thereon upon rotation of the shaft 11 when fluid is delivered through the meter. The cam 17 operates contacts 19 in an electric circuit which also includes contacts 90, Fig. 1, actuated by the auto-stop register 3.

When the contacts 19 and 90 are closed and certain other contacts actuated by the elements or buttons 120 on the billing machines also are closed, the circuit is completed through the wire 20 to the time delay relay 22, Fig. 1. This relay 22 actuates the contact 24 which also is connected to the wire 20. When the contact 24 is closed the circuit is completed also to solenoid 26 which actuates the clutch 28 by actuating lever 25 against the bias of a spring 27 attached thereto. This clutch may be of conventional type driven by continuously operating motor 29 to connect and disconnect the motor to drive shaft 30 and gears 31. The driven gear 31 is carried on the shaft 32 which also carries a worm 34 arranged to drive the worm gear 35 fastened on the sleeve 37 of the auto-stop register 3.

The auto-stop register may be of conventional type having the units wheel 39, tens wheel 40 and wheels of higher order 41 and 42. The units wheel 39 carries a disc 43 which rotates therewith. The wheels 40, 41 and 42 respectively carry discs 44, 45 and 46 which rotate therewith. The disc 43 has a recess 48 which is so arranged with respect to the units wheel 39 that when said wheel is in zero position the recess 48 receives the roller 49 carried on the horizontally extending arm 51 of a bell crank which has an upwardly extending arm 53. Rollers 55, 57 and 59 respectively are associated with the discs 44, 45, 46 and are carried on a rod 61 fastened at its end in arms 63 and 65. These arms are also connected by the shaft 67 supported in bearings 69. The arms 63 and 65 and the rod 61 and shaft 67 form a rigid frame which is pivotally movable in the bearings 69 to provide for simultaneous movement of the roller 55, 57 and 59 into and out of the recesses formed respectively in the discs 44, 45 and 56.

Fastened to the arms 63 and 65 and extending over upon the horizontal arm 51 of the bell crank 51, 53 is a bar 71. Pivotal movement of the frame which include the arms 63 and 65 caused by rotation of any of the discs 44, 45, 46 moving the corresponding rollers 55, 57 and 59 out of their cooperating recesses also is effective to move the arm 51 downwardly in Fig. 1, that is, to the position shown with the roller 49 cammed out of the recess 48, even though this recess 48 of the disc 43 associated with the units wheel 39 is in registering position with said roller 49. The arm 51, therefore, is depressed as long as any of the wheels 39, 40, 41, 42 are in a position other than a zero position. Upon the return of the wheels 40, 41, 42 to zero position the bar 71 moves upwardly as the rollers 55, 57, 59 enter the recesses. The arm 51, however, may remain depressed in the position shown in Fig. 1 until the recess 48 comes into register with the roller 49. Thereupon the arm 51 will move upwardly as the roller 49 enters the recess 48.

The auto-stop register 3 may be set by operation of the crank 75 fastened on the shaft 76, the shaft 76 being operatively connected to the auto-stop register in a conventional manner which permits the sleeve 37 driving the wheels 39, 40, 41, 42 to be rotated by the register drive 2 even though the shaft 76 is held against rotation. On the upper end of the shaft 32 the worm 80 is fastened which drives the worm gear 81 operatively connected to drive shaft 83 of the integrating and printing register 84 in conventional manner. Printing means, the operation of which is to be described more particularly hereinafter, also is arranged in connection with this register 84.

Adjacent the upwardly extending arm 53 of the bell crank 51, 53 which is actuated by the units wheel disc 43 of the auto-stop register contacts 90 are arranged to be closed when, as shown in Fig. 1, the arm 51 of the bell crank is depressed by movement of the roller 49 out of the recess 48. This is accomplished by operation of the crank 75 in setting of the auto-stop register. Return of the recess 48 into registering position with the roller 49 permitting the arm 51 to rise unless prevented by bar 71 opens the contacts 90. From an electrical supply 92 through wire 93 connected to the blade 94 in switchbox 95 and wire 91 connection is made to the contacts 90 of the auto-stop register when the blade 94 engages the contact 96 in said switchbox. By operation of the elements or buttons as hereinafter described the switch blade 94 may be thrown from engagement with the contact 96 to engagement with the contact 97. This blade 94 may be made of spring material so that it may be flexed to throw the blade to and from engagement with the contacts 96 and 97, bending on the ends of pins 140 and 142 in the actuation of the elements or buttons 120 and in resetting of the register 84 as described below.

When the blade 94 is in engagement with the contact 96 the circuit is carried through the auto-stop contacts 90 and wire 98 to contacts 306 which are actuated by the button identified with loading station #1 on billing machine B. Through wire 100, Fig. 2, connection is made from contacts 306 to contacts 201 and 204 actuated by the button on machine A which is associated with the same loading station #1. From the contacts 204 wire 101 connects to the contacts 19 which are actuated by the cam 17 as above described. It will be apparent that when the auto-stop register is set to a setting corresponding to an amount of material to be dispensed through the meter 5 and the blade 94 of switch 95 is bent into engagement with the contact 96 and button #1 of machine A is pressed to the position shown in Fig. 2 to close the contact 204, the circuit is completed to the register drive 2 whenever the cam 17 closes contacts 19. The construction of the rotating parts within the meter 5 and the ratio of bevel gears 12, 13 are such that the shaft 15 is rotated one revolution for each unit of measurement of the fluid flowing through the meter 5. An impulse thus is delivered through wire 20 to the register drive 2 once for each unit of measurement by the meter. This impulse actuates the clutch 28 to rotate the shaft 30 and effect rotation of the auto-stop register 3 and of the integrating and printing register 84. The time delay relay 22, after a predetermined time for which it is set, opens the contact 24 and deenergizes the relay 26 to disconnect the clutch 28, thus stopping the operation of the registers. The registers, therefore, are operated in step by step manner concomitantly with the operation of the meter through the intervention of the cam 17 and contacts 19.

With the button #1 of machine A in the actuated position as shown in Fig. 2, connection also is made through lead 103 from the contacts 201 to the hand operated switch 105 from which connection is continued to the solenoid 9. When the circuit is completed from the auto-stop register as just described closing of the hand operated switch 105 by the operator at the loading station or by the driver when he desires to take delivery energizes the solenoid 9 to open the valve 7 for delivering the fluid through the meter. Operation of the switch 105, however, is ineffective to produce delivery unless the auto-stop register is set and the switch blade 94 is in engagement with the contact 96 and, as well, the button #1 of either machine A or machine B is pressed.

A lead or wire 110 corresponding to the lead 98 from the auto-stop register of machine A is shown in Fig. 2 which connects from contacts actuated by the auto-stop register of machine B (not shown) to the contacts 206 actuated by button #1 of machine A, these contacts 206 being open when the button #1 of machine A is pressed. The contacts 206 are connected to contacts 301 and 304 actuated by button #1 of machine B. The contacts 301 and 304 are open when button #1 of machine B is in the unactuated position as shown in Fig. 2. The contact 304 is connected to contacts 109 which are operated by the cam 17 as are the contacts 19. From the contacts 109 through wire 111 connection is made to the register drive of machine B operating similarly to register drive 2 of machine A to drive the auto-stop register and the integrating and printing register of machine B. Connection is also made from contacts 301 to the hand operated switch 105 and to the solenoid 9 for operation of the valve 7 of loading station #1.

It will be apparent that when a button corresponding to a given loading station, for example loading station #1, is pressed in one machine it is effective to interrupt the circuit leading through contacts actuable by corresponding buttons on the other machines which are connected to the same loading station. Intentional or inadvertent actuation of the button of a machine corresponding to the same loading station which would normally connect said other machine to the loading station will be ineffective to establish such connection either for operation of the register drive of the second machine or the operation of the valve 7 of the loading station to which the first machine is connected. This is accomplished by interrupting the circuit at contacts 206 when button #1 of machine A is pressed and at contacts 306 when button #1 of machine B is pressed. These contacts, however, are closed when the button is in the unactuated position so that on pressing of the button #1 on the other machine the circuits may be established through contacts 201 and 204 or 301 and 304 as the case may be.

Each of the elements 120 corresponding respectively to loading stations #1, #2, #3 and #4 on each of machine A and B carries a cam bowl 122 which is effective with cams 123 and blocks 124 to prevent actuation of a second element on the same machine corresponding to a different loading station as shown in Fig. 2. Actuation of element 120 corresponding to button #1 moves the cam bowl into position to prevent pivotal movement of the cams, thus to prevent the cam bowl carried by a second element 120 from moving between the cams or between the cam and the block 124 into the actuated position as shown for element 120 of button #1. Thus the connection of more than one loading station to the same machine is prevented.

By means of latches 125 actuated by solenoids 126 connected in parallel with each other and as a group in series with a motor 130, Fig. 1, between the supply line 92 and ground, the elements 120 are held in the actuated position by engagement of the latch by the notch 127 in the element. Resistance of the solenoids is such with respect to the motor winding that the motor 130 is not energized for rotation except when the solenoids are short-circuited which may be accomplished by actuation of the switch blade 94 into engagement with the contact 97 of switch 95, Fig. 1, or by operation by hand of the switch 134 in Fig. 1, or by other means hereafter described. Such short-circuiting will de-energize the solenoids 126 and permit the latch 125 to be moved out of engagement with the notch 127 by the spring 129.

Each element 120 upon actuation is adapted to engage member 133 fastened upon a shaft 134 arranged for sliding movement in bearing 135. The member 133 and shaft 134 are biased by spring 136 against actuation by the element 120. This spring is effective upon release of the element 120 when the solenoid 126 is de-energized to return the element 120 to its unactuated position. For the element corresponding to loading station #1, Fig. 2, this will effect closing of the contact 206 and opening of the contacts 201 and 204, thus opening the circuits to solenoid 9 and relays 22 and 26 to close the valve 7 and stop the register drive 2.

At its opposite end from the member 133 the shaft 134 carries a bar 138 engaging a pin 140 extending slidably through the wall of the switch box 95 into engagement with the switch blade 94. At the opposite side of the box 95 a second pin 142 extends slidably through the wall of the box into engagement with the blade 94, pin 142 being actuated by cam 144 carried on shaft 132 of motor 130. With the cam 144 in the position shown in Fig. 1 holding pin 142 inwardly of the switch box 95, actuation of a button, such as button #1 of Fig. 2, will press the element 120 against the member 133 to move the pin 140 inwardly of the switch box 95 and bend the blade 94 upon the end of pin 142 into engagement with the contact 97. The circuit is then established through the lead 93 from the supply 92 to motor 130 to rotate the motor shaft 132. As the solenoids 126 are short-circuited by such closure of the circuit through motor 130 the latches 125 therefore are ineffective to hold the element in the depressed position and disconnection of the valve 7 and register 2 would take place as above stated. The button, for example, button #1, however, may be held by hand to energize the motor 130 to rotate the shaft 132 until the register 84 is reset.

This resetting of the register 84 is accomplished by means of a mutilated gear 147 on the motor shaft 132 engaging the gear 148 carried on shaft 145 to rotate gear 149 also carried on shaft 145 to drive through idler pinion 150 and gear 152 the register shaft 154 for the resetting operation of the register 84. Construction and arrangement of the parts is such that rotation of the shaft 132 through 180° will effect resetting of the register 84, the teeth of the mutilated gear 147 then passing out of engagement with the gear 148. Upon such completion of the rotation through 180° in the direction of the arrow, the cam 144 will pass from the position as shown in Fig. 1 to a position where the pin 142 has just moved from engagement with the larger lobe of the cam to engagement with the smaller lobe thereof. The leaf 94 of the switch then may straighten from its bent position of Fig. 2 so as to be thrown into engagement with the contact 96. This disconnects the contact 97 and removes the short circuit from the solenoids and stops the motor 130. The actuated element 120 then is retained in actuated position by the latch 125, held by the energized solenoid 126.

The apparatus and system now are conditioned for registering operation of the amount of fluid to be delivered through the meter which may be initiated by operation of the hand operated switch 105 provided the auto-stop register has been set to the predetermined amount of fluid to be delivered. Upon completion of the registration of the predetermined amount, that is, upon return of the auto-stop register 3 to its zero position as the registers are driven by the register drive means 2, the contacts 90 will be opened and the solenoid 9 controlling valve 7 will be de-energized unless it is maintained energized by other means. The register drive 2 also will be stopped because the circuit to this drive is interrupted by the opening of the contacts 90.

For the purpose of effecting delivery of the fluid in full units of measurement, a cam 16 is mounted on shaft 15 with the toe 18 of the cam engaging in its rotation the movable member of contacts 160. These contacts are connected in series with the solenoid 9 for operating the valve 7 between the supply line 92 and ground. In this circuit also are connected contacts 163 of relay 165 arranged to be held closed on energization of its solenoid which is connected to ground in parallel with the solenoid 9. When the solenoid 9 is energized the relay 165 is energized and the circuit through the contacts 163 held closed by relay 165 is established except for an interval once in each revolution of the shaft 15, that is, when the toe 18 of the cam 16 engages the movable contact 160 to open these contacts. Thus the circuit through the solenoid 9 is maintained after opening of the contacts 90 by return of the auto-stop register to zero and until the last unit of fluid measured by the meter has passed through the meter. The cam 16 is arranged on shaft 15 so that contacts 160 are opened precisely upon the completion of said last unit to effect de-energization of the solenoid 9 and closure of the valve 7 under its bias and thus complete the delivery in full units of measurement.

Such final interruption of the circuit to the solenoid 9 also de-energizes the solenoid 165 and opens contacts 163. The relay 165 and the contacts 163 therefore are effective to prevent the circuit through the contacts 160 being re-established in the event that the shaft 15 is rotated beyond the precise point of completion of the last unit of measurement by the meter corresponding to the amount set on the auto-stop register. Such "coasting" of the meter and rotation of the shaft 15 which would move the point of the cam from engagement with the contact 160 and thus effect reclosing of these contacts 160, which may occur because of compression of the air or gas in the fluid, may not only produce a false reading on the register 14 but would re-open the valve 7 unless the circuit through the contacts 160 to the solenoid 9 is interrupted. This is accomplished by the opening of the contacts 163 when the relay 165 is de-energized simultaneously with the solenoid 9 upon opening of the contacts 160. When, however, the circuit is completed through the auto-stop contacts 90, the switch blade 94 and contact 96 and the element actuated contacts as above described, operation of the hand operated switch 105 in a subsequent dispensing operation, will energize the solenoid 165 simultaneously with the solenoid 9 and the circuit through the contacts 160 will be established but will be opened once in each revolution of the shaft 15, that is, once for each unit of measurement of the fluid being delivered made by the meter 5.

On completion of the registering and metering operation the auto-stop register, having returned to zero, is effective to close contacts 239, 240 which are connected in a circuit more fully described hereafter to motor 130 to start motor 130. Such energization of motor 130 will short-circuit the solenoids 126 and release the element 120 which has been actuated for the dispensing operation, that is, in the operation being described the element 120 associated with button #1 corresponding to the loading station #1. Rotation of the shaft 132 by the motor 130 rotates the gear 147 from the position to which it was rotated in the resetting operation of the register 84 above described to the position shown in Fig. 1. This rotation brings the teeth of the mutilated gear 147 into engagement with the gear 170 carried on shaft 171 which also carries a mutilated gear 173 and cam 175 to rotate said gear and cam. During such rotation of the shaft 171 the teeth of the gear 173 engage the pinion 177 to cause rotation of the shaft 178 to drive feed rollers 182 for feeding the paper to the printing register 84. Rotation of the shaft 171 in the direction of the arrow caused by rotation of the motor 130 in the direction of the arrow, as shown in Fig. 1, moves the cam from the position shown and permits the cam follower 179 carried on arm 180 fastened to the printing hammer 181 to drop from its position at the point of the cam as shown in Fig. 1 to the surface of the cam of less diameter, thus causing the printing hammer 181 to move downwardly and to press the paper upon the printing elements of the register 84. The ratio of the gears 147 and 170 is such that shaft 171 and cam 175 are rotated one revolution during engagement of these two gears. The mutilated gear 173 has such a number of teeth and is in such a position on the shaft 171 that it starts the feeding movement of rollers 182 after the printing hammer has pressed the paper and been lifted somewhat therefrom by rotation of the cam 175. When the mutilated gear 173 has passed out of engagement with gear 177 the paper is in position ready for printing the registered amount in a subsequent dispensing operation and the portion just printed may be removed showing the record of the amounts dispensed for the current dispensing operation.

Figure 4:
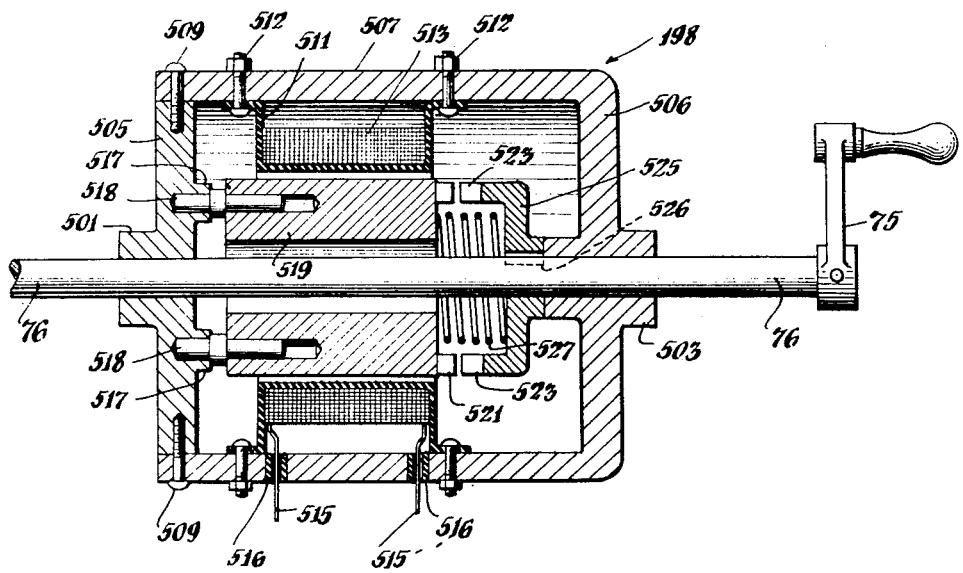
Fig. 4 shows the construction of the means for preventing change in the setting of the auto-stop register.

In order to prevent setting of the auto-stop so as to initiate a dispensing operation in the event that the paper strip 183 breaks or runs out on the roll 185, means are provided as shown in Fig. 1 for preventing rotation of the shaft 76 by operation of the crank 75. Beneath the edge of the paper 183 is arranged a U-shaped member 187. Intermediate the ends of the U and above the paper is arranged a feeler in the form of a lever 189 pivotally supported at 190 and biased downwardly by spring 191. This lever has a toe 188 for contact with the paper. The opposite end of the lever 189 projects upwardly and operates the movable contact 193 into engagement with the fixed contact 194 whenever the paper 183 fails to pass between the toe 188 of the lever 189 and the U-shaped member 187. When no paper bridges the span between the ends of the U-shaped member the spring 191 pulls the lever 189 downwardly to close the contacts 193, 194. Contact 194 is connected by lead 195 and lead 93 to the supply 92. The contact 193 is connected by lead 196 to an electromagnetic grip 198 the construction of which is shown in Fig. 4 and which surrounds shaft 76 of the auto-stop register. When this electromagnetic grip 198 is energized by closing the contacts 193, 194, it is effective to prevent rotation of the shaft 76. As long as the toe 188 of the lever 189 bears upon the paper and the lever 189 thereby is held against the pull of the spring 191, the circuit to the electromagnetic grip 198 is open but is completed upon failure of the paper thus to support the toe 188 of lever 189, thus to prevent setting of the auto-stop register until the paper is is renewed.

In order to prevent change in the setting of the auto-stop register after the dispensing operation has started while permitting this auto-stop register to be set at any time before actual flow of the fluid takes place, the electromagnetic grip 198 also is energizable by means which are under the control of the auto-stop register itself so as to become effective upon opening of the valve 7. This grip, however, also is under control of means which are actuated by the motor 130 and which, when this motor is operated to reset the wheels of the integrating and printing register as above described, condition the circuit to the grip so as to be effective upon opening of the valve 7 to prevent change in the setting of the auto-stop. Upon operation of motor 130 to print the record this means is effective to continue the operation of the electromagnetic grip until the printing is completed and the valve is finally closed. The auto-stop register by virtue of these means of the invention may be set at any time in the preparation of the apparatus for normal carrying out of the dispensing operation prior to the closing of the hand operated switch 105 to effect delivery of the fluid through the meter. Thus the element 120 actuated by a button, for example, button #1, may be actuated to effect resetting operation of the register 84 and the auto-stop register then may be set or this may be accomplished in reverse order.

To effect energization of the electromagnetic grip 198 concomitantly with energization of the solenoid 9 to open the valve 7, a triple contactor relay 215 is provided the contacts 220, 221 of which are connected through wire 218 in parallel with the paper controlled contacts 193, 194 between the supply line 92 and the lead 196 connected to the electromagnetic grip. Upon closing of the contacts 220, 221 the electromagnetic grip 198 is energized to prevent rotation of the shaft 76 by the crank 75. Movable contact 220 is mechanically connected to but insulated from movable contact 223 to open and close contacts 223, 224 simultaneously with contacts 220, 221. Contact 223 is connected by wire 225 to a fixed contact 226 associated with pivoted contact blade 228 which is biased to closed position by the spring 229 and actuated to open position by the toe 230 of a cam 231 mounted on shaft 132 of the motor 130. The pivoted contact blade 228 is connected through the lead 93, Fig. 1, to the supply 92. The relay 215 having armature 216 to operate contacts 220, 221 and 223, 224, as well as contacts 233, 234 hereafter referred to, is connected to ground from lead 219, to which contact 224 also is connected. The lead 219 is connected to supply line 92 through contacts 167 of the relay 165. The movable contact 167 is mechanically connected to the movable contact 163 to move therewith. Thus the circuit is closed to the relay 215 when the relay 165 is energized, this condition occurring when valve operating solenoid 9 is energized, as above described.

When the solenoid 9 is energized by closing of the auto-stop register operated contacts 90 and completion of the circuit through the blade 94 and contact 96 of switch 95 and contacts of an actuated element 120 and the hand operated contact 105, the relay 215 will be energized through contacts 167 and lead 219 to close contacts 220, 221 and contacts 223, 224. If, upon such energization of the relay 215 the contacts 226, 228 are closed, the circuit is established from the supply 92 through leads 93 and 225 and contacts 226, 228 and 223, 224 to relay 215 and thence to ground. This relay then maintains itself energized by holding the contacts 223, 224 closed. The contacts 220, 221 also thus are maintained closed, thereby to maintain the circuit completed from the supply 92 through contacts 220, 221 and wire 218 to the electromagnetic grip 198 thus to prevent operation of the crank 75 and change in the setting of the auto-stop register. Energization of the grip 198 will be continued as long as the relay 215 is energized, that is, until the auto-stop register has opened contacts 90 upon its return to zero and the contacts 160 also are opened by the cam 16 to deenergize solenoid 9 and relay 165, thus to open contacts 167, at the completion of the last full unit of measurement of the fluid being dispensed and, further, until the contacts 226, 228 are opened.

Opening of contacts 226, 228 is effected in the printing operation above referred to by bringing the toe 230 of the cam 231 into position in Fig. 1 upon completion of the printing operation. Breaking of the contacts 226, 228 concomitantly with breaking of the circuit controlled by the contact 167 which is actuated by relay 165 after the circuits which are connected to the solenoid 9 and relay 165 have been interrupted by the auto-stop register and cam 16 de-energizes the relay 215. When the relay 215 is de-energized its armature 216 is released and the contacts 220, 221 and 223, 224 are opened, thus breaking the circuit to the electromagnetic grip 198 and preventing re-energizing of the relay 215 upon reclosing of the contacts 226, 228 until the relay 215 again is energized by setting the auto-stop register and resetting of the register 84 by actuation of the button corresponding to a given loading station have been completed.

In such resetting operation, as above described, which will rotate the shaft 132 the toe 230 of cam 231 is advanced from the position shown in Fig. 1 through 180°. This toe of the cam will not be returned again from this advanced position to the position shown in Fig. 1 until the motor 130 again is operated to effect rotation of the shaft 132 to print the record. Printing may be effected by the operation of the switch 131 or preferably automatically as hereafter described. Thus the contacts 226, 228 are closed at the same time that the switch blade 94 is moved into engagement with the contact 97 on pressing of the element 120 corresponding to a given loading station. Thereafter, or at any time prior to actuating of the hand operated contact or switch 105, the auto-stop register may be set by operation of the crank 75 and the circuit completed to the solenoid 9 upon closing of the hand operated switch 105 as above described. This closing of the switch 105 is the final step for energizing the relay 165, as well as the solenoid 9, thereby also to energize the relay 215 to establish the circuits connected to the contacts 220, 221 and 223, 224 actuated by relay 215 and to energize the electromagnetic grip 198 simultaneously with the opening of the valve 7. Up to the time, therefore, that the hand operated switch 105 is closed by the operator at the loading station or by the driver to whom the material is to be delivered, the auto-stop register may be set to any position or changed from one position to another if such change is found necessary for any reason.

In order automatically to open the contacts 226, 228 upon completion of the dispensing operation thereby to condition the circuits for de-energizing the relay 215 after the solenoid 9 and the relay 165 are de-energized, in the particular embodiment illustrated in the drawing an auxiliary fixed contact 235 is arranged for contact by the pivoted contact member 228. Contact 235 is connected by wire 237 to contact 239 of the pair of contacts 239, 240 which are opened as shown in Fig. 1 when the auto-stop register is set to an amount to be metered and registered but are closed concomitantly with the opening of the contacts 90 upon return of the auto-stop register to zero. The contact 240 is connected by wires 241 and 242 to the motor 130 through contacts 233, 234, above referred to, the movable contact blade 233 being mechanically connected to contact blades 220 and 223 to move therewith but being insulated therefrom. Thus, if the auto-stop is at zero the circuit may be completed upon closing of the contact 235 from the supply 92 through wire 93, contacts 228, 235, wire 237, contacts 239, 240, wire 241, contacts 233, 234 and wire 242 to motor 130. This circuit is completed when at the completion of the metering or registering operation the auto-stop reaches zero, the cam 231 being in a position at 180° from that shown in Fig. 1 as above described. Since the relay 215 is energized and contacts 233, 234 closed at this time the motor 130 will be energized upon closing of contacts 239, 240 to rotate cam 231 to the position of Fig. 1 to cause the toe 230 of said cam to actuate the contact blade 228 to open the circuit through contact 226 to relay 215 and to open the circuit through contact 235 to motor 130. After completion of the last full unit of measurement by operation of cam 16 and contact 160 the relay 215 will be de-energized by the opening of contact 226, 228. This will open contacts 233, 234 by virtue of the mechanical connection therebetween and the circuit to the motor, already interrupted by open contacts 228, 235 will remain open during the next resetting operation of motor 130, even though contacts 239, 240 remain closed because the auto-stop has not yet been set in such subsequent operation.

Resetting operation of the motor 130 effected by actuation of a selected button to move the blade 94 into engagement with the contact 97 rotates cam 231 from the position shown in Fig. 1 to release the pivoted contact member 228 to close with contacts 226 and 235 under the bias of spring 229. When the auto-stop register is set to a setting corresponding to an amount of fluid to be delivered, thus closing contacts 90, contacts 239, 240 and the circuit to the motor through these contacts will be opened ready to be closed upon return of the auto-stop to zero to complete the circuit to the motor 130 for the printing operation as above described. Upon completion of resetting of the register 84 the cam 144 throws the switch blade 94 to engagement with the contact 96 and the motor 130 will be stopped in the position 180° from that shown in Fig. 1, leaving the pivoted contact member 228 in engagement with both the contact 226 and the contact 235. The solenoid 9 and relays 165 and 215, therefore, will be energized during the dispensing operation as above described. Upon return of the auto-stop register to zero, thus closing the circuit to the motor 130 through contacts 228, 235, contacts 239, 240 and contacts 233, 234 to effect the printing operation and the feeding of the paper as described, the solenoids 126 become short-circuited and de-energized to release the actuated element 120, that is button #1 in Fig. 2 corresponding to loading station #1. The cam 230, upon being rotated by motor 130 through 180° during this printing operation, again actuates the pivoted contact member 228 to move it from engagement with the contacts 226, and 235, thus opening the circuit through wire 225 to the relay 215. The relay 215 becomes de-energized as soon as the relay 165 simultaneously with solenoid 9 is de-energized by opening of contacts 160. The dispensing operation, therefore, is completed with the delivery of the last full unit as determined by the contact 160 actuated by the meter operated cam 16. The circuits thus controlled then are again conditioned for subsequent resetting and dispensing operations.

The relay 215 and the contacts 220, 221 and 223, 224, and 233, 234 associated therewith may be located at the loading station or adjacent the billing machine as desired. Preferably these parts are located at the machine as shown in Fig. 1 since they may be arranged adjacent the contacts 226, 228 and the electromagnetic grip 198, thereby shortening the leads connecting these parts, it then being necessary only to carry the lead 219 from the machine to the loading station for the concomitant operation of the solenoid 9 and relay 165 and of relay 215 as described. Where a plurality of machines are at a remote point, for example at an office some distance from the loading station or stations, the number of leads is thereby reduced and the apparatus associated essentially with each machine is located adjacent the machine with which it is associated where it may be more easily supervised. It is to be understood that a relay similar to the relay 215 which is associated with machine A in Fig. 1 may be associated with machine B and connected through lead 219 to the same relay 165 of loading station #1 as shown in Fig. 2.

Summarizing briefly the sequence of operations which may be carried out in the improved system of the invention:

The machine operator selects the loading station at which the fluid is to be dispensed and operates the button, for example button #1, corresponding to loading station #1 on the machine on which the registration is to be made, for example on machine A. This moves the blade 94 into engagement with the contact 97 as shown in Fig. 1 to energize motor 130. The shaft 132 of motor 130 is rotated to produce resetting operation of the register 84. Such rotation closes the contacts 226, 228, the cam 231 being rotated to move the toe 230 thereof from engagement with the pivoted contact blade 228. Upon rotation of shaft 132 and cam 144 through 180° the switch blade 94 is released from the bent position shown in Fig. 1 in engagement with contact 97 and is thrown to engagement with contact 96, thus breaking the circuit to the motor 130 and stopping rotation of the shaft 132. This puts the register 84 in condition for integrating registering operation when driven by the register drive 2 in step by step operation under control of the contacts 19 which are intermittently actuated by the cam 17 concomitantly with the metering operation of the meter. The element 120 of button #1 now is held by the latch 125.

The auto-stop register 3 may have been set to the amount desired to be dispensed prior to any of these steps of the preparatory operation or it now may be set thus to close the contacts 90. The circuits then are all conditioned so that when the hand operated switch 105 is closed at the loading station not only is the solenoid 9 energized to open the valve 7 but the relay 165 is energized to complete the circuits as above described to energize the electromagnetic grip 198 to prevent thereafter change in the setting of the auto-stop register until the dispensing operation is completed. Following the completion of the last full unit of measurement of the fluid delivered through the valve 7 as determined by the cam 16 and the contacts 160 and the "anti-coasting" relay 165, the electromagnetic grip 198 is de-energized upon completion of the operation of the motor 130 to print the record. This printing as well as feeding of the paper are accomplished automatically when the auto-stop reaches zero position to close contacts 239, 240 to energize motor 130 through contacts 233, 234. The cam 231 thus is rotated to the position shown in Fig. 1 to break contacts 226, 228. Breaking of the contacts 226, 228 effects final de-energizing of the relay 215 and opening of all the contacts 220, 221; 223, 224; 223, 234 and de-energization of the electromagnetic grip 198, after the final de-energization of the solenoid 9 and closing of valve 7 to stop delivery. Contacts 228, 235 also are opened to stop motor 130 and the printing and proper feeding of the paper is completed.

If desired, as disclosed in said applications of Hazard and Shipman Serial Nos. 448,644 and 583,916, the arm 63 of the auto-stop register 3 may have associated therewith contacts for controlling a circuit similar to the circuit controlled by the contacts 90 but connected to means for operating a valve controlling gross flow in a branch pipe parallel to pipe 11. In such case the gross flow valve may be closed when the tens wheel 40 and all wheels of higher order have returned to their zero positions.

Figure 3:
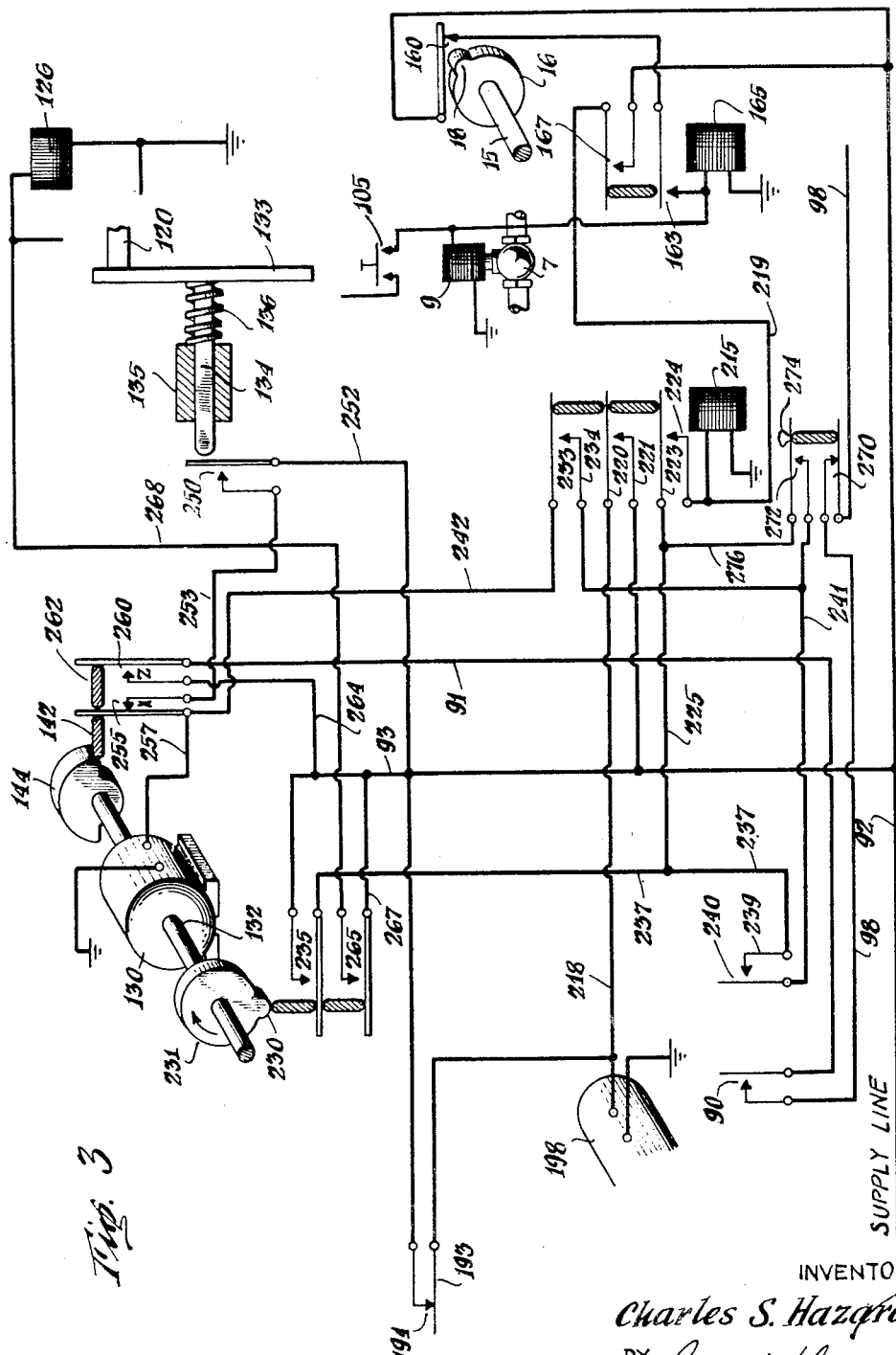
Fig. 3 shows as a modification of the invention certain parts also shown in Fig. 1 with the electric circuits associated therewith.

In Fig. 3 is shown a modification of the invention in which certain of the parts, together with the associated circuits and contacts, which operate in the same manner as described in connection with Fig. 1 are diagrammatically represented. In Figs. 1 and 3 like parts are identified with the same numeral. The apparatus of Fig. 3 as to certain features operates in the same manner as does the apparatus of Fig. 1 taken in connection with Fig. 2.

With the apparatus of Fig. 3, however, it is unnecessary to hold the button or element 120 in its actuated or pressed position, as with the apparatus of Figs. 1 and 2, until the resetting operation is completed in order that the solenoids 126 which are short-circuited by operation of the motor 130 may become energized upon stopping of the motor 130 by disconnecting the blade 94 from the contact 97, Fig. 1. The element or button 120 when it is pressed is effective in the device of Fig. 3 to close a circuit to the solenoids 126 thus to actuate the latches 125 immediately to hold the element in its pressed position until the metering and registering operation is completed.

Upon pressing a button, such as button #1 of Fig. 2 to actuate the element 120, movement of the shaft 134 slidably supported in bearing 135 thus produced by the vertical member 133 against the bias of spring 136 is effective in the apparatus of Fig. 3 to close a contact 250, this contact being connected between the supply line 92 through leads 93, 252, and 253 to a contact 255 which is actuated by pin 142. The pin 142 engages and is operated by cam 144 in the same manner as described in connection with Fig. 1. The cam 144 thus is effective to close the contact 255 when the larger lobe of the cam 144 engages the pin 142. As described in connection with Fig. 1, such engagement occurs in the position shown in Fig. 3 upon completion of the printing operation and is continued through the resetting operation during which the cam is moved through 180° from the position shown in Fig. 3. Upon completion of the resetting operation the pin 142 engages the smaller lobe of the cam 144 and the contact 255 thereby is opened. Contact 255 is connected through wire 257 to the motor 130. It will be apparent, therefore, upon actuation of a button or element 120 to close the contact 250, when the cam is in the position shown in Fig. 3, that the motor 130 will be energized to rotate this cam through 180° thereby also to rotate the cam 231 mounted on the shaft 132 of the motor to move the toe 230 of the cam 231 from the position shown in Fig. 3 to close the contacts 235. These contacts 235 in Fig. 3 serve the purpose of both of the contacts 235 and 226 of Fig. 1 as will be apparent from the description to follow. The shaft 132 is connected, as in Fig. 1, to the register 84 and to the printing hammer 181 and the paper feed rolls 179 and 182.

Upon completion of the resetting operation which effects opening of the contacts 255, contacts 260 which also are operated by the cam 144 through pin 142 and mechanical connection 262 are closed. The contacts 260 are connected from the supply line 92 through leads 93 and 264 and then through lead 91 to the contact 90 which is operated by the auto-stop register, as described in connection with Fig. 1. Thus the closing of the contact 260 at the end of the resetting operation in the device of Fig. 3 establishes the circuit from the supply 92 through the auto-stop contacts 90 and lead 98, contacts 306, lead 100 and contacts 201 and 204, Fig. 2, and then through leads 103 and 101 respectively to complete the circuits to the hand-operated switch 105 which is operated by the loading station attendant or the driver, as stated in connection with Figs. 1 and 2 and to the register drive 2, Fig. 1.

It will be apparent, therefore, that in the apparatus of Fig. 3 the sequence of operations thus far described, which may be carried out by the machine operator, from the moment of actuation of button or element 120 until the circuit to the solenoid 9 and to the relay 165 is conditioned upon setting of the auto-stop register for completion by the closing of the switch 105 is the same as that described in connection with Figs. 1 and 2. The resetting operation, however, is effected by closing of the element actuated contacts 250 in series with the cam actuated contacts 255, whereas in Fig. 1 the blade 94 is actuated directly by the mechanical operative connection from the element 120 in cooperation with the mechanical actuation of the pin 142 by the cam 144. The arrangement of Fig. 3 may be advantageous under certain conditions where an electrical connection between the portion of the billing machine which includes the buttons or elements 120 and the parts actuated thereby may be more or less distant from the means including the motor 130 for effecting resetting operation of the register. Thus the leads 252 and 253 may be carried between the two locations referred to without the necessity of more or less complicated mechanical connections which might be required if the apparatus were arranged as shown in Fig. 1. Where direct connection may be made, however, apparatus such as that of Fig. 1 may be utilized.

In Fig. 3 is shown a set of contacts 265 which are actuated by cam 231 at the same time as the contacts 235 by a mechanical connection therebetween, the contacts 265 being opened simultaneously with the opening of the contacts 235 when the toe 230 of the cam 231 is in the position shown in Fig. 3. When this cam 231 is rotated from the position shown through 180° in the resetting operation, as above described, the contacts 265 are closed and the circuit is thereby established from the supply line 92 through leads 93, 267, contacts 265, and lead 268 to the group of solenoids 126 which are connected in parallel with each other and thence to ground. The solenoids 126 of the group are arranged in mechanical relation to the elements 120 in the same manner as shown in Fig. 2. Thus, upon initiation of the resetting operation which moves the cam 231 from the position shown, the solenoids 126 immediately will be energized by the closing of the contacts 265. The actuated element 120, therefore, will be held in its actuated or pressed position because the latch 125 associated therewith will be moved pivotally by its solenoid 126 so that the toe of the latch will engage the notch 127 of the element 120. As the contacts 265 will remain closed until the completion of the printing operation by rotation of the cam 231 again to the position shown in Fig. 3 in the manner described in connection with Fig. 1, the solenoids 126 remain energized throughout the resetting operation and throughout the dispensing operation which may immediately follow the resetting operation. Thus it becomes unnecessary in the apparatus of Fig. 3 to hold the button, such as button #1, depressed by hand, to hold the element 120 in the actuated position thus to maintain the motor 130 energized until completion of the resetting operation, so that thereafter the solenoid 126 and latch 125 will maintain contacts 201 and 204 closed and contact 206 open. Upon completion of the printing operation, however, which effects opening of the contacts 265, Fig. 3, the solenoids 126 will be deenergized and the pressed button will be released to its initial position for reactuation in a subsequent dispensing and registering operation.

As with the apparatus described in connection with Figs. 1 and 2, the apparatus of Fig. 3 is provided with circuits connected to and for controlling the operation of the electromagnetic grip 198 both by the paper controlled contacts 193, 194 and the contacts 220, 221 of the relay 215. The contacts 220, 221 are closed upon energization of the relay 215 which also closes holding contacts 223, 224 to establish the circuit from the supply line 92 through lead 93, contacts 235, leads 237 and 225 and the holding contacts 223, 224 connected to relay 215 and thence to ground. The relay 215 when it has become energized will remain energized as long as the contacts 235 and the contacts 223, 224 remain closed. The relay 215 is energized by the closing of the contacts 167 which are connected between the supply line 92 and the wire 219, which also is connected to the contact 224, the contacts 167 being closed by energization of the relay 165 in the same manner as shown and described in connection with Figs. 1 and 2. The operation of the relay 165, contacts 163 and 167 and of the valve operating solenoid 9 will be apparent without detailed description because their operation is identical with that described in connection with Figs. 1 and 2.

In both embodiments the relay 215 first becomes energized when the contact 167 is closed after the auto-stop register has been set to close the contacts 90 and upon actuation of the hand-operated switch 105. The relay 215 remains energized to maintain the electromagnetic grip energized to prevent alteration of the setting of the auto-stop register until the auto-stop register has returned to zero and, thereafter, the relay 165 has been deenergized at the completion of a full unit of measurement by the meter by the opening of the contacts 160 actuated by the cam 16. The relay 215 then becomes deenergized by opening of contacts 167 unless the contacts 235 are still closed.

When the auto-stop register returns to zero, as described in connection with Fig. 1, the contacts 239 and 240 will be closed. As the contacts 235, Fig. 3, are closed at this time the circuit will be established from the supply line 92 through lead 93, contacts 235, lead 237 to the contacts 239, 240 and thence through lead 241, contacts 233, 234, leads 242 and 257 to the motor 130. The motor 130 thus energized will rotate the shaft 132 to effect printing operation at the register 84 as described in connection with Fig. 1. Such rotation again will bring the toe 230 of the cam 231 into the position shown in Fig. 3 to open the contacts 235 thus to break the circuit to the motor 130. Such interruption of the circuit through the contacts 235 also will break the circuit to the relay 215 after the contacts 167 have been opened by deenergization of the relay 165 at the completion of the last full unit of measurement under control of the cam 16 as above stated. Deenergization of the solenoid 215 in addition to opening the holding contacts 223, 224 and the contacts 220, 221 which will deenergize the electromagnetic grip 198 also opens the contacts 233, 234 to insure stopping of the motor 130 as well as to prevent continued operation of this motor if the auto-stop register has not yet been set from its zero position, contacts 239, 240 thus being closed, when the contacts 235 are closed during the resetting operation.

It thus will be apparent that upon pressing of a button such as button #1 corresponding to meter or loading station #1, resetting operation of the register 84 is effected and the button is maintained in its actuated position. Before such actuation of a button to actuate the element 120 or at any time thereafter prior to closing the switch 105 the auto-stop register may be set to close the contacts 90. By these two operations the system is completely conditioned so that when the hand-operated switch 105 at the loading station is closed, the dispensing operation at once will be initiated automatically by the opening of the valve 7. Simultaneously the "anti-coasting" relay 165 will be brought into operation, the relay 165 also being effective through its contact 167 to energize the relay 215 thereby to energize the electromagnetic grip 198 and to condition the circuits as described so that upon return of the auto-stop register to zero to close the contacts 239, 240 the printing operation will be carried out at the register 84 and thereafter automatically the solenoid 9 and the relays 165 and 215 will be deenergized upon completion of the last full unit of measurement by the meter corresponding to the amount registered by the register. Upon completion of the printing operation the button or element 120 which has been pressed is released. The apparatus thereupon is conditioned for a subsequent dispensing operation which may be initiated by actuation of the same or a different button or element 120. Such actuation serves first to reset the register 84 and thereafter automatically to carry out the several steps of the dispensing operation which have been described for delivery of an amount of fluid measured to correspond to the setting of the auto-stop register.

Inserted in the lead 98 which connects from the auto-stop actuated contacts 90 to the contacts 306, Fig. 2, as above described, are contacts 270 of an emergency stop device. The movable blade of the contacts 270 is mechanically connected to the movable blade of contacts 272, the fixed elements of these contacts being so arranged with respect to the respective movable blades that contacts 270 are closed when the contacts 272 are open. The contacts 270 are biased to the closed position, contacts 272 being biased to opened position. Actuation by hand of these mechanically connected contacts against their bias by means of the knob 274, that is, by lifting the knob 274 in Fig. 3, is effective to break the circuit normally closed by the setting of the auto-stop register, actuation of a selected button or element 120 and closure at the loading station of the hand-operated switch 105. The emergency stop may be so located that such interruption of the circuit through the lead 98 may be accomplished by the machine operator, or one or more emergency stops in this lead 98 may be located at other points convenient for operation in the case of emergency. It will be apparent as contacts 270 are in series with contacts 90 that opening of the contacts 270 by operation of the emergency stop will deenergize the solenoid 9 and the relay 165 with the consequent closure of the valve 7 upon completion of the current unit of measurement being measured by the meter 5 under control of contact 188 in the manner above described. The circuit through the lead 28 to the register drive 2, Fig. 1, also will be interrupted, so that registration by the register 84 and by the auto-stop register 3 will be stopped.

In order to effect printing of the record of the amount registered at the moment of emergency stopping of the registers, the contact 272 is connected in parallel with the contacts 239 and 240 which, as above described, in the normal operation of the auto-stop register are closed upon return of the auto-stop register to zero. Upon closing the contacts 272 by operation of the emergency stop, the circuit will be established through the closed contacts 235 and through leads 237, 225, 276, contacts 272, lead 241, contacts 233 and 234, leads 242 and 257 to the motor 130. The circuit thus established energizes the motor 130 to rotate the cam 231 to the position shown in Fig. 3 from the position it assumed in resetting of the register 84. The contacts 235 thus are opened by the toe of cam 230 and the circuit to the relay 215 is interrupted after completion of the current unit of measurement, thus opening the holding contacts 223, 224 which have maintained the relay 215 energized as long as the contacts 235 are closed. Deenergization of the relay 215 also opens the contacts 233, 234. The contacts 265 also are opened when the cam 231 is rotated to the position shown in Fig. 3. The solenoids 126, therefore, are deenergized to release the actuated element 120. The auto-stop register lock 198 likewise is deenergized by the opening of the contacts 220, 221 in the manner above described. Thus the circuits are conditioned as above described for resetting operation of the resettable register and a subsequent dispensing operation upon actuation of a button or element 120 and setting of the auto-stop register. In Fig. 4 is shown in longitudinal section one embodiment of the electromagnetic grip 198 which is constructed to cooperate with shaft 76 of the auto-stop register 3 to prevent rotation of this shaft and change in the setting of the auto-stop register after the element 120 identified with the selected loading station in a selected billing machine is actuated.

The shaft 76 passes through bearings formed in the bosses 501 and 503 provided respectively in the end closing plate 505 and in the end wall 506 of the casing 507 of the device. In this embodiment the casing 507 is of cylindrical form with the end wall 506 integral therewith. To this casing the end closing plate 505 is fastened by screws 509 entering the periphery of this plate through the cylinder wall of casing 507. Within the inner bore of the casing 507 is a spool 511 fastened to the casing by screws 512. This spool carries the coil 513 of a solenoid the terminals 515 of which pass out through the wall of the casing 507 through insulating bushings 516. The terminals 515 are connected respectively to ground and to the contacts 193, 194 and contacts 220, 221 as shown in Figs. 1 and 3.

In holes drilled in bosses 517 formed on the end plate 505 a plurality of pins 518 are rigidly fastened and extend generally parallel to the axis of the shaft 76. Preferably, these pins are formed of non-magnetic material. Co-axially with the shaft 76 an armature 519 of annular cylindrical form is supported on the pins 518, this armature being provided with holes extending therein parallel to the axis of the armature which fit slidably on the pins 518 to provide for movement of the armature in the direction parallel to the axis of the shaft 76. At the right hand end of the armature in Fig. 4 the armature is provided with teeth 521 adapted to cooperate as a clutch with the teeth 523 of a cooperating clutch member 525 fitted upon the shaft 76 and keyed thereto by the key 526. The clutch member 525 may be of cylindrical form and cup shaped to receive a compression spring 527 which bears against the end wall of the cup and against the end of the armature 519 to bias this armature toward the left in Fig. 4 to the position shown where the teeth 521 and 523 are disengaged.

It will be noted that the armature 519 is of such length and is so positioned relative to the central plane of the solenoid coil 513 that upon energization of this coil effected by closing of the contacts 193, 194 or 220, 221 the armature 519 will be drawn toward the right substantially to a position symmetrical with respect to the central plane of the solenoid coil 513. In such movement toward the right the teeth 521 and 523 of the clutch members will be engaged with each other. Since the casing 507 of the electromagnetic grip 198 is fixed against rotation, it will be apparent that upon energization of the solenoid 513 the shaft 76 will be held against rotation if operation thereof by the handle 75 fastened thereto is attempted. Thus, when a selector element 120 of a given billing machine with which the auto-stop 3 is associated is pressed to select the loading station and meter to be connected to the given billing machine and its registers, the auto-stop having been concomitantly set to the amount to be dispensed, thereafter and until the auto-stop has returned to zero thereby releasing the actuated element 120 the setting of the auto-stop may not be changed by the operation of the handle 75. The device shown in Fig. 4 may be variously designed to cooperate with the auto-stop register and the means actuated by element 120 to produce the result of preventing change in the setting of the auto-stop register during the operation thereof in a dispensing operation of the apparatus.

Other variations from the illustrated and described embodiments of the invention may be made within the scope thereof. Instead of electrical circuits, contacts and devices, other means may be used for securing operation of the registers as determined by operation of the measuring device and for actuating the valve or valves under control of the presettable register, subject to the controls and devices which constitute the features of invention which provide for automatic registering, metering and recording operation upon selection of the meter or loading station by actuation on a selected machine of a selected button corresponding to such meter or loading station and which also provide for setting of the presettable register at any time prior to the actual starting of the delivery and for insuring thereafter proper operation automatically to complete the delivery in full units of measurement in accordance with the selected setting of said presettable register. The invention, therefore, is not intended to be limited in its scope except as defined in the appended claims.

I claim:

1. In a dispensing apparatus the combination with a measuring device, means for controlling delivery of material through said measuring device, means settable from an initial position to a position corresponding to an amount of material to be measured, and means operatively connecting said settable means to said delivery controlling means to effect delivery of said material through said device in an amount corresponding to the setting of said settable means, of means operatively connected to said settable means and actuated upon operation of said delivery controlling means to deliver said material for preventing change in the setting of said settable means while said settable means controls said delivery controlling means to deliver said amount of said material to be measured.

2. In a dispensing apparatus the combination with a resettable register a fluid meter, means for controlling delivery of fluid through said meter, a presettable register settable from an initial position to a position corresponding to the amount of fluid to be measured, and means operatively connecting said presettable register to said fluid control means to control said fluid control means to effect delivery of fluid through said meter in an amount corresponding to the setting of said presettable register, of means operatively connected to and actuatable to condition said connecting means so as to be effective to establish said control upon setting of said presettable register and upon initial actuation thereof operatively connected to said resettable register to reset said resettable register for registering operation, means operatively connected to said resettable register and effective when said resettable register is reset for registering operation and operatively connected to and effective upon operation of said fluid control means establishing flow of fluid through said fluid meter and operatively connected to said presettable register for preventing change in the setting of said presettable register while said presettable register operates to control delivery of the amount of fluid through said meter for which said presettable register is set, and means operatively connected to and effective after said presettable register completes control of said fluid control means to complete delivery of said fluid for releasing said means for preventing alteration of the setting of said presettable register to permit renewed setting thereof.

3. In a fluid dispensing apparatus the combination with a fluid meter, a valve for controlling flow of fluid through said meter, a presettable register, and means actuated by said presettable register and operatively connected to said valve to control operation thereof while said presettable register is operated from a position of setting to an initial position to determine the amount of fluid measured through said meter, of means operatively connectible to said presettable register for preventing change in the setting thereof during said metering operation, means operatively connected to said presettable register and to said preventing means and effective to establish and to maintain said preventive connection of said preventing means to said presettable register throughout said metering operation, and means operatively connected to said presettable register and effective upon completion of the control of said metering operation by said presettable register for disconnecting said preventing means from said presettable register to permit renewed setting thereof.

4. In a fluid dispensing apparatus the combination with a resettable register, a fluid meter, a valve for controlling flow of fluid through said meter, an auto-stop register, and means controlled by said auto-stop register operatively connectible to said valve to control operation thereof for metering operation of said meter, of an element operatively connected to said resettable register for effecting resetting operation thereof, means responsive to actuation of said element and to resetting operation of said resettable register and operatively connected to said auto-stop register so as to be effective upon completion of said resetting operation to establish said operative connection from said auto-stop register to said valve upon setting of said auto-stop register to a position corresponding to an amount to be measured, means operatively connectible to said auto-stop register for preventing alteration of the setting thereof, and means operatively connected to said preventing means and controlled by said auto-stop register concomitantly with its control of said valve and effective to establish and to maintain said connection of said preventing means to said auto-stop register throughout said control of said valve by said auto-stop register during the registering and metering operation.

5. In a fluid dispensing apparatus the combination as defined in claim 4 which includes means actuated by said meter and operatively connected to and effective for rendering said means operatively connected to said preventing means and controlled by said auto-stop register concomitantly with its control of the operation of said valve ineffective to maintain said operative connection of said preventing means to said auto-stop register upon completion of metering operation of said meter, means operatively connected to said auto-stop register and operated upon completion of the registering operation to record the registration of said resettable register, and means actuated upon operation of said recording means and operatively connected to and effective to disconnect said preventing means from said auto-stop register.

6. In a fluid dispensing apparatus the combination as defined in claim 4 which comprises means controlled by said meter and operatively connected to and effective during the operation of said auto-stop register to control said valve so as to maintain the flow of fluid through said meter except at intervals occurring at the completion of each unit of measurement by said meter, said means being effective to close said valve after completion of said control by said auto-stop register so as to complete the delivery of said metered fluid in full units of measurement, said preventing means and said means operatively connected to said preventing means and controlled by said auto-stop register concomitantly with its control of said valve being so connected to said means controlled by said meter that said connection of said preventing means to said auto-stop register is maintained until completion of the last unit of measurement by said meter and thereupon is discontinued.

7. In a fluid dispensing apparatus the combination with a presettable register, a fluid meter, a valve for controlling flow of fluid through said meter, of means controlled by said register and means controlled by said meter both operatively connected to said valve to control operation thereof, said register-controlled means being capable of maintaining said valve in open position in all setting positions of said register other than its initial position, said meter-controlled means normally during the metering operation being capable of maintaining said valve in open position except at intervals occurring only at the completion of each unit of measurement by said meter, means effective at said intervals for closing said valve whenever said register is in its initial setting position, whereby closure of said valve is effected only at the completion of a full unit of measurement of the fluid being dispensed, and means controlled by said register and by said meter concomitantly with their control of said valve for preventing alteration of the setting of said presettable register after initiation of its control of said valve.

8. In a fluid dispensing apparatus, the combination as defined in claim 7 which comprises a resettable register, and means actuated upon resetting operation of said resettable register and operatively connected to and effective to condition said preventing means so as to initiate such prevention concomitantly with operation of said valve to start delivery of fluid to said meter.

9. In a fluid dispensing apparatus the combination as defined in claim 7 which comprises means responsive to operation of said means controlled by said presettable register and of said means controlled by said meter and effective upon completion of the registering and metering operations for releasing said preventing means to permit subsequent setting of said presettable register.

10. In a fluid dispensing apparatus, the combination as defined in claim 7 which comprises a resettable register, means actuated upon resetting operation of said register and operatively connected to said preventing means to make said means effective for preventing alteration of the setting of said presettable register, means operable to record the registration of said resettable register, and means actuated upon operation of said means operable to record said registration for releasing said preventing means to permit subsequent setting of said presettable register.

11. In a fluid dispensing apparatus, the combination with a resettable register, a fluid meter, a valve for controlling flow of fluid through said meter, and an auto-stop register operatively connected to said valve to control operation thereof for metering operation of said meter, of means for effecting resetting operation of said resettable register, means operatively connectible to said auto-stop register for preventing alteration of the setting thereof, means operatively connected to said preventing means and controlled by said auto-stop register concomitantly with its control of said valve for effecting said operative connection of said preventing means to said auto-stop register, said three means being operatively interconnected so that upon operation of said means for effecting resetting of said resettable register and upon setting thereafter of said auto-stop register said preventing means is made effective to prevent alteration of said setting of said auto-stop.

12. In a fluid dispensing apparatus, the combination with a resettable register, a fluid meter, a valve for controlling flow of fluid through said meter, and an auto-stop register operatively connected to said valve to control operation thereof for metering operation of said meter, of a motor connected to said resettable register for effecting resetting rotation of said register, electrically energizable locking means operatively connected to said auto-stop register for locking said auto-stop register against alteration of its setting, electric control means actuated by said motor upon resetting operation thereof and connected to said locking means to energize said locking means to lock said auto-stop against alteration of its setting, said connection being conditioned by means controlled by said auto-stop register concomitantly with its control of said valve to establish and maintain said connection when said auto-stop register is in a position of setting other than zero and to remove said conditioning upon return of said auto-stop register to zero, and means actuated by said auto-stop register upon return thereof to zero for operating said motor to actuate said electric control means to deenergize said locking means upon completion of flow of fluid through said valve.

13. In a dispensing apparatus, the combination with a recording register, means for feeding paper to said recording register for printing the record of the registration thereon, a measuring device, means for controlling delivery of material through said measuring device, means settable from an initial position to a position corresponding to an amount of material to be measured, and means operatively connecting said settable means to said delivery control means to effect delivery of said material through said measuring device in an amount corresponding to the setting of said settable means, of means operatively connected to said settable means and operable for preventing alteration of the setting of said settable means, and means operatively connected to said preventing means and engaged by the paper as it is fed to said recording register and actuated upon failure of such engagement to operate said preventing means to prevent setting of said settable means.

14. In a dispensing apparatus, the combination with a recording register, means for feeding paper to said recording register for printing the record of registration thereon, a fluid meter, a valve for controlling delivery of fluid through said meter, and an auto-stop register operatively connected to said valve to control said valve to deliver said fluid in amount determined by the setting of said auto-stop register, of means operable to lock said auto-stop register to prevent alteration of the setting thereof, and means operatively connected to said locking means arranged for engagement by the paper as it is fed to said recording register and actuated upon failure of such engagement to effect operation of said locking means to prevent alteration of the setting of said auto-stop register.

15. In a dispensing apparatus the combination as defined in claim 14 in which said locking means comprises electric means energizable to effect locking operation of said locking means, said means engaged by the paper being operatively connected to electric control means connected in circuit with said locking means and effective to energize said locking means upon failure of said engagement of said paper engaging means by said paper.

16. In a fluid dispensing apparatus, the combination with a presettable register, a fluid meter, and a valve for controlling flow of fluid through said meter, of means controlled by said register and means controlled by said meter both operatively connected to said valve to control operation thereof, said register controlled means being capable of maintaining said valve in open position in all setting positions of said register other than its initial position, said meter controlled means normally during metering operation being capable of maintaining said valve in open position except at intervals occurring only at the completion of each unit of measurement by said meter, means effective at said intervals for closing said valve whenever said register is in its initial setting position, whereby closure of said valve to stop flow of said fluid is effected only at the completion of a full unit of measurement of the fluid being dispensed, and means responsive to said meter controlled means and effective upon said closure of said valve and upon completion of the last unit of measurement by said meter for preventing said meter controlled means from again maintaining said valve open until said presettable register again is set to a position other than said initial position.

17. In a dispensing apparatus the combination with a measuring device, means for controlling delivery of material through said measuring device, and means settable from an initial position to a position corresponding to an amount of material to be measured, of means controlled by said settable means and means controlled by said measuring device both operatively connected to said means for controlling delivery of material through said measuring device to control operation thereof, said means controlled by said settable means being effective to maintain delivery in all positions of setting other than said initial position, said means controlled by said measuring device normally during measuring operation being capable of maintaining said delivery except at intervals occurring at the completion of each unit of measurement by said measuring device, means effective at said interval for stopping said delivery whenever said settable means is in said initial position, and means thereupon effective and connected to said means controlled by said measuring device to prevent said means controlled by said measuring device from operating to effect delivery while said settable means is in said initial position.

18. In a dispensing apparatus the combination with a measuring device, means for controlling delivery of material through said measuring device, and means settable from an initial position to a position corresponding to the amount of material to be measured, of means for operatively connecting said settable means to said delivery controlling means to effect delivery of said material through said measuring device in an amount corresponding to the setting of said settable means, means operatively connected to and actuatable to condition said connecting means so as to establish said operative connection of said settable means to said delivery controlling means upon setting of said settable means, and means responsive to actuation of said actuatable means and effective independently of the setting of said settable means for maintaining said actuatable means actuated so as to condition said connecting means to establish said operative connection of said settable means to said delivery control means in all positions of said settable means other than its initial position.

19. In a fluid dispensing apparatus the combination with a fluid meter, a valve for controlling flow of fluid through said meter, and a presettable register, of means actuated by said presettable register and operatively connectible to said valve to control operation thereof while said presettable register is operated from a position of setting to an initial position to determine the amount of fluid measured through said meter, an element actuatable to establish said operative connection from said means actuated by said presettable register to said valve, and means actuated by said element upon such actuation thereof and operatively connected thereto to maintain said element in its actuated position thereby to maintain said operative connection throughout the operation of said presettable register from said position of setting to said initial position and operatively connected to said means actuated by said presettable register and effective in said initial position to release said element to interrupt said operative connection.

20. In a fluid dispensing apparatus the combination with a resettable register, a fluid meter, a valve for controlling flow of fluid through said meter, and an auto-stop register, of means controlled by said auto-stop register operatively connectible to said valve to control operation thereof to deliver fluid to said meter for metering thereof, an element operatively connected to said resettable register and actuatable to effect resetting operation of said register, means responsive to actuation of said element and to resetting operation of said register and operatively connected to said auto-stop register so as to be effective upon completion of said resetting operation for establishing said operative connection from said auto-stop register to said valve upon setting of said auto-stop register from its initial position to a position corresponding to an amount to be measured, and means responsive to actuation of said element to reset said resettable register and effective for maintaining said element in its actuated position to maintain said operative connection from said auto-stop register to said valve while said auto-stop register maintains its control of said valve during registering and metering operations.

21. In a fluid dispensing apparatus the combination as defined in claim 20 which comprises means actuated by and effective upon return of said auto-stop register to its initial position for releasing said element from its actuated position so as to disestablish said operative connection from said auto-stop register to said valve and to stop delivery of said fluid to said meter, and means actuated by said auto-stop register and effective upon release of said element for conditioning said element and said means responsive to actuation thereof for subsequent resetting operation of said resettable register and reestablishment of said operative connection from said auto-stop register to said valve in a subsequent dispensing operation.

22. In a fluid dispensing apparatus the combination with a resettable register, a fluid meter, a valve for controlling flow of fluid through said meter, and an auto-stop register, of means for resetting said resettable register, means controlled by said auto-stop register operatively connectible to said valve to control operation thereof to deliver fluid to said meter for metering thereof, an element operatively connected to and actuatable to effect operation of said means for resetting said resettable register, means responsive to actuation of said element and to resetting operation of said register and operatively connected to said auto-stop register so as to be effective upon completion of said resetting operation for establishing said operative connection from said auto-stop register to said valve upon setting of said auto-stop register from its initial position to a position corresponding to an amount to be measured, means responsive to actuation of said element to reset said resettable register and effective for maintaining said element in its actuated position so as to maintain said operative connection from said auto-stop register to said valve while said auto-stop register maintains its control of said valve during registering and metering operations, means actuated by and effective upon return of said auto-stop register to its initial position for releasing said element, and means actuated by said auto-stop register and effective upon such release of said element for conditioning said means for resetting said resettable register for subsequent resetting operation thereof.

23. In a dispensing apparatus, the combination with a measuring device, means for controlling delivery of material through said measuring device, a presettable register, a resettable register, means operatively connecting said registers to said measuring device for registering operation thereof concomitantly with measuring operation of said measuring device, and means for recording the registrations of said registers, of means controlled by said presettable register operatively connectible to said delivery controlling means to control operation thereof to effect delivery of said material through said measuring device in amount corresponding to the setting of said presettable register from an initial position to a selected position of setting, means energizable to effect resetting operation of said resettable register, means operatively connected to and actuatable to energize said energizable means to effect resetting operation of said register and operatively connected to said register controlled means concomitantly to establish said operative connection from said presettable register to said delivery controlling means, means operable to effect recording operation of said recording means, means actuated by and effective upon return of said presettable register to its initial position and operatively connected to said means operable to effect recording operation of said recording means to effect operation thereof, and means actuated by said means operable to effect said recording operation and effective upon completion of said operation of said recording means for conditioning said means energizable to effect resetting of said register for operation thereof upon subsequent actuation of said actuatable means.

24. In a dispensing apparatus the combination with a resettable register, and means for effecting registering operation of said register corresponding to the amount of material dispensed, of means operatively connected to said resettable register and operable to reset said register from a position of registering to an initial position for renewed registering operation thereof, means operatively connected to and actuatable to effect operation of said means operable to reset said resettable register and operatively connected to and effective upon such actuation to produce operation of said means for effecting registering operation of said register, means operatively connected to and effective upon actuation of said actuatable means for maintaining said actuatable means actuated during said resetting and registering operations and means actuated by said means operable to reset said register and effective upon completion of said registering operation for conditioning said actuatable means and said means operable to reset said register for resetting of said register upon subsequent actuation of said actuatable means.

25. In a dispensing apparatus the combination with a resettable register, an auto-stop register, and means for driving said registers to register the amount of material dispensed, of means for resetting said resettable register, a first circuit connectible to said means for resetting said resettable register, means in said circuit actuated by said resetting means in the resetting operation of said register for deenergizing said circuit to complete the resetting operation of said resettable register, an element actuatable to energize said first circuit to effect connection thereof to said means for resetting said resettable register upon actuation of said element, a second circuit, means in said second circuit actuated by said auto-stop register when said auto-stop register is in its initial position for connecting said second circuit to said means for resetting said resettable register to condition said resetting means for resetting operation thereof, and means actuated by resetting means on completion of said conditioning thereof and effective to condition said element for reactuation thereof to effect renewed resetting operation of said resettable register.

26. In a fluid dispensing apparatus the combination with a resettable register, a fluid meter, a valve for controlling flow of fluid through said meter, an auto-stop register operatively connected to said valve to control operation thereof to deliver the amount of fluid corresponding to the setting of said auto-stop register, means operatively connecting said meter and said registers for effecting registering operation thereof corresponding to metering operation of said meter, of a motor operatively connected to said resettable register for effecting resetting operation thereof, a first circuit connected to said motor and having therein a pair of contacts in series with each other, a given one of said contacts being actuatable to closed position to initiate the conditioning of the apparatus for the dispensing operation, means actuated by said motor for initially holding the other of said contacts closed and effective to open said other contact upon completion of the resetting operation to stop said motor, a second circuit connected to said motor having a contact therein which is actuated to closed position by said auto-stop register when said auto-stop register is in its zero position and to open position upon setting of said auto-stop register to a position of setting to correspond to the amount of fluid to be dispensed, said second circuit also having therein a second contact in series with said auto-stop actuated contact, means actuated by said motor in resetting operation of said register for closing said second contact in said second circuit, said second circuit also having a third contact in series with said auto-stop actuated contact and said second contact, means operatively connected to said auto-stop register and effective when said auto-stop register is in a position of setting other than its zero position for closing said third contact and effective when said auto stop register is in its zero position for opening said third contact, whereby said motor is operated from the position to which it is rotated in the resetting operation to restore it to a position to resume resetting operation when said auto-stop register is restored to its initial position, means actuated by said motor for opening said second contact in said second circuit upon completion of said restoring movement of said motor to stop said restoring movement of said motor, and means actuated by said motor to open said first contact and to close said other contact in said first circuit upon completion of said restoring movement of said motor and to condition said first circuit for reactuation of said first contact to effect resetting operation of said register.

27. In a dispensing apparatus the combination with a measuring device, means for controlling delivery of material through said measuring device, and means settable from an initial position to a position corresponding to the amount of material to be measured, of means for operatively connecting said settable means to said delivery control means to effect when said connection is established the delivery of said material through said measuring device in an amount corresponding to the setting of said settable means, means operatively connected to and actuatable to condition said connecting means so as to establish said operative connection of said settable means to said delivery controlling means upon setting of said settable means, means responsive to actuation of said actuatable means and effective independently of the setting of said settable means for maintaining said actuatable means actuated so as to condition said connecting means to establish said operative connection thereof to said delivery control means in all positions of said settable means other than its initial position, and means cooperating with said last three defined means and operable at will to establish and to disestablish said operative connection of said settable means to said delivery control means.

28. In a dispensing apparatus the combination as defined in claim 27 in which said means operable at will when operated to disestablish said operative connection also is effective to deactuate said means actuatable to condition said operative connecting means.

29. In a fluid dispensing apparatus the combination with a resettable register, a fluid meter, means operatively connecting said register to said meter for registering operation of said register concomitantly with operation of said meter, a valve for controlling flow of fluid through said meter, an auto-stop register, and means controlled by said auto-stop register operatively connectible to said valve to control operation thereof for metering operation of said meter, of an element operatively connected to said resettable register and actuatable to effect resetting operation of said register, and means responsive to actuation of said element and to resetting operation of said register and operatively connected to said means controlled by said auto-stop register and to said means connecting said resettable register to said meter and effective upon completion of said resetting operation to establish said operative connection from said auto-stop register to said valve for flow of fluid through said meter and to effect said registering operation of said meter upon setting of said auto-stop register to a position corresponding to an amount to be measured, said operative connection from said auto-stop register to said valve including means operable at will to effect disconnection of said auto-stop register from said valve to shut said valve and stop delivery of said fluid.

30. In a fluid dispensing apparatus the combination as defined in claim 29 which comprises means actuated upon operation of said means operable at will for recording the amount registered by said registers.

31. In a fluid dispensing apparatus the combination as defined in claim 29 which comprises means actuated upon operation of said means operable at will and operatively connected to said element and said register to condition said element and said registers for subsequent resetting and registering operation upon subsequent actuation of said element and setting of said auto-stop register.

CHARLES S. HAZARD.

REFERENCES CITED

The following references are of record in the file of this patent:

UNITED STATES PATENTS

| Number | Name | Date |
|---|---|---|
| 1,607,899 | Long | Nov. 23, 1926 |
| 1,876,512 | Pfening et al. | Sept. 6, 1932 |
| 2,250,326 | Carroll | July 21, 1945 |